(12) United States Patent
Do Rosario et al.

(10) Patent No.: US 11,966,113 B2
(45) Date of Patent: Apr. 23, 2024

(54) COMPOSITE PANE WITH FUNCTIONAL ELEMENT WHICH CAN BE SWITCHED IN SEGMENTS AND HAS ELECTRICALLY CONTROLLABLE OPTICAL PROPERTIES

(71) Applicant: SAINT-GOBAIN GLASS FRANCE, Courbevoie (FR)

(72) Inventors: Jefferson Do Rosario, Aachen (DE); Florian Manz, Aachen (DE); Sebastian Schurse, Übach-Palenberg (DE); Johannes Wolf, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 577 days.

(21) Appl. No.: 17/283,452

(22) PCT Filed: Sep. 12, 2019

(86) PCT No.: PCT/EP2019/074407
§ 371 (c)(1),
(2) Date: Apr. 7, 2021

(87) PCT Pub. No.: WO2020/083563
PCT Pub. Date: Apr. 30, 2020

(65) Prior Publication Data
US 2021/0341772 A1 Nov. 4, 2021

(30) Foreign Application Priority Data
Oct. 26, 2018 (EP) .................................... 18202831

(51) Int. Cl.
*G02F 1/1334* (2006.01)
*B32B 17/10* (2006.01)
(Continued)

(52) U.S. Cl.
CPC ...... *G02F 1/1334* (2013.01); *B32B 17/10036* (2013.01); *B32B 17/10321* (2013.01);
(Continued)

(58) Field of Classification Search
CPC ............... G02F 1/1334; G02F 1/13306; G02F 1/134309; B32B 17/10036;
(Continued)

(56) References Cited

U.S. PATENT DOCUMENTS

2002/0044331 A1 4/2002 Agrawal et al.
2004/0227462 A1 11/2004 Utsumi et al.
(Continued)

FOREIGN PATENT DOCUMENTS

CN 107614302 A 1/2018
CN 108646495 A 10/2018
(Continued)

OTHER PUBLICATIONS

International Search Report as issued in International Patent Application No. PCT/EP2019/074407, dated Nov. 21, 2019.

*Primary Examiner* — William Choi
(74) *Attorney, Agent, or Firm* — Pillsbury Winthrop Shaw Pittman LLP

(57) ABSTRACT

A composite pane having an electrically controllable functional element that can be switched in segments, includes first and second panes joined to one another via an intermediate layer, and a functional element with a plurality of side edges embedded in the intermediate layer. The functional element includes, arranged flat one over another, a first surface electrode and a second surface electrode, between which an active layer is arranged flat. The first surface electrode is divided into multiple segments by a separating line. A group of first busbars electrically conductively contact the first surface electrode, and each segment (Continued)

Figure 1A:
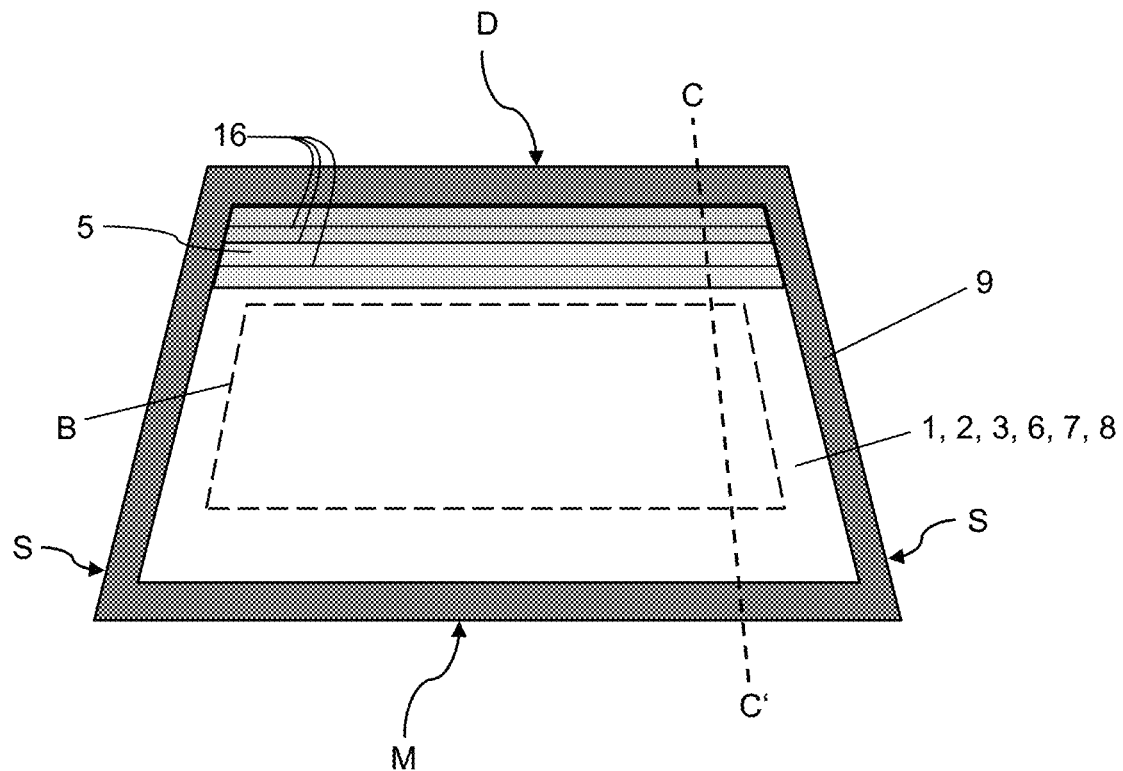

of the first surface electrode is electrically conductively contacted by one busbar from the group of the first busbars. A second busbar electrically conductively contacts the second surface electrode.

19 Claims, 5 Drawing Sheets

(51) Int. Cl.
*B60J 1/00* (2006.01)
*B60J 3/04* (2006.01)
*G02F 1/133* (2006.01)
*G02F 1/1343* (2006.01)

(52) U.S. Cl.
CPC .. *B32B 17/10504* (2013.01); *B32B 17/10761* (2013.01); *B60J 1/001* (2013.01); *B60J 3/04* (2013.01); *G02F 1/13306* (2013.01); *G02F 1/134309* (2013.01); *B32B 2605/006* (2013.01)

(58) Field of Classification Search
CPC ........ B32B 17/10321; B32B 17/10504; B32B 17/10761; B32B 2605/006; B60J 1/001; B60J 3/04
USPC .......................................................... 359/245
See application file for complete search history.

(56) References Cited

U.S. PATENT DOCUMENTS

| 2012/0026573 | A1 | 2/2012 | Collins |
| 2012/0147449 | A1 | 6/2012 | Bhatnagar et al. |
| 2016/0306249 | A1 | 10/2016 | Egerton et al. |

FOREIGN PATENT DOCUMENTS

| DE | 10 2005 007427 A1 | 8/2006 |
| DE | 10 2005 049081 B3 | 6/2007 |
| DE | 10 2007 027296 A1 | 12/2008 |
| DE | 10 2008 026339 A1 | 12/2009 |
| DE | 20 2008 017611 U1 | 5/2010 |
| DE | 10 2010 021563 A1 | 12/2011 |
| DE | 10 2013 001334 A1 | 7/2014 |
| EP | 0 847 965 B1 | 6/1998 |
| EP | 0 876 608 B1 | 11/1998 |
| EP | 1 830 380 A1 | 9/2007 |
| EP | 1 862 849 A1 | 12/2007 |
| JP | 2010-217636 A | 9/2010 |
| JP | 2015-169835 A | 9/2015 |
| KR | 10-2016-0035035 A | 3/2016 |
| KR | 10-2018-0059531 A | 6/2018 |
| RU | 2 288 850 C2 | 12/2006 |
| RU | 2 289 510 C2 | 12/2006 |
| WO | WO 97/20210 A1 | 6/1997 |
| WO | WO 2010/112789 A2 | 10/2010 |
| WO | WO 2010/147494 A1 | 12/2010 |
| WO | WO 2011/033313 A1 | 3/2011 |
| WO | WO 2012/007334 A1 | 1/2012 |
| WO | WO 2012/052315 A1 | 4/2012 |
| WO | WO 2015/014511 A1 | 2/2015 |
| WO | WO 2017/157626 A1 | 9/2017 |

C-C'

A-A'

COMPOSITE PANE WITH FUNCTIONAL ELEMENT WHICH CAN BE SWITCHED IN SEGMENTS AND HAS ELECTRICALLY CONTROLLABLE OPTICAL PROPERTIES

CROSS-REFERENCE TO RELATED APPLICATIONS

This application is the U.S. National Stage of PCT/EP2019/074407, filed Sep. 12, 2019, which in turn claims priority to European patent application number 18202831.6 filed Oct. 26, 2018. The content of these applications are incorporated herein by reference in their entireties.

The invention relates to a composite pane having a functional element that can be switched in segments and having electrically controllable optical properties, a method for its production, and its use.

For protection against dazzling of the driver or other occupants, conventional motor vehicles have mechanical sun visors. These are hinge-mounted on the vehicle roof and can be pivoted downward as needed to prevent or at least to mitigate the dazzling of the driver or front-seat passenger, for example, when the sun is low.

Also known are windshields into which a sun visor is integrated in the form of a functional element with electrically controllable optical properties, in particular with electrically controllable transmittance or scattering properties. Thus, the driver can control the transmittance behavior of the windshield itself relative to sunlight; the conventional mechanical sun visor can be dispensed with. By this means, the weight of the vehicle can be reduced and space is gained in the roof region. In addition, electrical control of the sun visor is more convenient for the driver than the manual folding down of the mechanical sun visor.

Electrically adjustable sun visors are, moreover, used in glass roofs of motor vehicles. In particular, in the case of large-area panoramic glass panes, there is a need to variably control the transmittance of the pane. Depending on the position of the sun, it is necessary to dim only subregions of the pane, or also to make the entire area non-transparent as a privacy screen in the parked vehicle.

One possible electrically switchable controllable functional element for realizing the controllable sun visor is a so-called "PDLC" functional element (polymer dispersed liquid crystal). The active layer contains liquid crystals that are incorporated into a polymer matrix. When no voltage is applied, the liquid crystals are randomly oriented, resulting in strong scattering of the light passing through the active layer. When a voltage is applied to the surface electrodes, the liquid crystals align themselves in a common direction and the transmittance of light through the active layer is increased. The PDLC functional element acts less by reducing total transmittance, but rather by increasing scattering to ensure protection against dazzling.

Windshields with electrically adjustable sun visors are known, for example, from DE 102013001334 A1, DE 102005049081 B3, DE 102005007427 A1, and DE 102007027296 A1. DE 102010021563A1 describes a windshield with an electrically adjustable sun visor that is switchable in subregions wherein the darkening of the individual elements is controllable via a capacitive sensor arrangement in the edge region of the sun visor.

The electrical contacting of electrically controllable functional elements is usually done via busbars that are attached on the surface electrodes in the edge region of the functional element and make electrically conductive contact therewith. By connecting the busbars to an external voltage source, for example, via flat conductors attached to the busbars, a voltage is applied to the surface electrodes and the active layer of the functional element is switched. In particular, in the case of small, individually switchable segments, it is difficult to ensure homogeneous switching behavior with the lowest possible operating voltages and long service life of the electrical contact. With decreasing size of the element to be switched, the area available for the electrical contacting of the surface electrodes to the busbars also decreases. A certain inhomogeneity of the surface electrodes in the region of the contacting area can be problematic, in particular with small contact areas. Inhomogeneities of the surface electrodes occur, for example, as a result of minor damage when exposing the electrically conductive layers to make subsequent contact. Such damage can already be triggered by particles of the active layer itself. Even the crystals contained in a PDLC layer suffice to scratch the surface electrode during removal of the PDLC situated on the surface electrode. The scratches result in locally elevated power consumption, in heating caused thereby, and, ultimately, in failure of the component. In the case of large-area busbars, the damaged portion of the contacting area compared to the overall area is quite small. However, as busbars become smaller, the proportion of damaged area increases, as a result of which increased component failure can be observed.

US 2016/0306249 A1 discloses an insulating glazing that includes an electrochromic element that includes a plurality of regions that can be switched electrically independently of one another.

WO 2017/157626 A1 discloses a windshield with a PDLC functional element, wherein the PDLC functional element is switchable in segments.

US 2002/0044331 A1 discloses a substrate with an electrochromic element, wherein the surface electrodes of the electrochromic element are provided with busbars along their circumference.

The object of the present invention is to provide a composite pane having a functional element that is switchable in segments with electrically controllable optical properties and that has improved electrical contacting with an increased service life.

The object of the present invention is accomplished by a composite pane having a functional element that is switchable in segments with electrically controllable optical properties according to the independent claim 1. Preferred embodiments are apparent from the dependent claims.

The composite pane according to the invention contains a functional element that is switchable in segments with electrically controllable optical properties, whose optical properties can be adjusted as a function of the voltage applied. The functional element is embedded in the intermediate layer of the composite pane. The intermediate layer joins the first pane and the second pane of the composite pane. The functional element includes an active layer between a first surface electrode and a second surface electrode. The surface electrodes and the active layer are arranged flat one over another. The active layer has the adjustable optical properties that can be controlled by the voltage applied to the surface electrodes. The surface electrodes and the active layer are typically arranged essentially parallel to the surfaces of the first pane and the second pane. The surface electrodes are electrically conductively connected to busbars, via which the functional element can be connected to an external voltage source. In order to be able to switch the functional element in sections, in the form of individual segments, these must be electrically controllable individually. For this, the first surface electrode is divided into multiple segments by at least one separating line. The separating line can also be referred to as an isolating line and effects electrical separation of the individual segments of the first surface electrode from one another. A group of first busbars is used to make electrically conductive contact with the first surface electrode, wherein each segment of the first surface electrode is contacted by one busbar of the group of the first busbars. The second surface electrode is electrically conductively contacted by at least one second busbar. The length of a first busbar along the segment associated with this busbar and thus to be electrically contacted by this busbar exceeds the width of the segment in this direction. Accordingly, the first busbars extend in their length beyond the width of the segments associated therewith. The first busbars of segments adjacent one another are arranged at opposite side edges of the functional element such that the first busbars do not obstruct one another spatially. In this manner, the length of the first busbars can advantageously be maximized and higher robustness and service life of the composite pane with a functional element can be achieved. The first busbars adjacent one another at a common side edge are electrically separated from one another by separating lines. According to the invention, the first busbars associated with adjacent segments are arranged at opposite side edges of the functional element. Accordingly, a first busbar of one segment is adjacent the first busbar of the next but one segment at a side edge.

The first surface electrode is contacted via the group of the first busbars with one pole of the voltage source and the second surface electrode is contacted via the at least one second busbar with the opposite pole of the voltage source. The voltage source can, depending on the type of functional element, be designed as an AC voltage source or a DC voltage source.

In the context of the invention, "a separating line" is a linear region within the surface electrode that is not electrically conductive and which extends over the entire thickness of the surface electrode.

According to the invention, the width of the segments of the first surface electrode is defined by the distance between the sections of one or more separating lines that limit the segment in its width. This is the shortest distance between two adjacent, essentially parallel, separating lines that extend between the side edges with first busbars. In the case of the end segments, the segment width is the shortest distance between the separating line and the side edge essentially parallel thereto along the direction of the first busbar. The width of the segments is measured in each case along the direction in which the associated first busbar runs. The length of the first busbars is thus measured along the segment width and beyond all the way to the end of the busbar.

The first busbars protrude beyond the width of the respective segment in electrical contact. The first busbars also come into spatial proximity with other segments not associated therewith. Each of the first busbars is associated with precisely one segment and is electrically separated from all other segments, with the exception of the segment associated with this first busbar. This makes it possible for the length of the busbars to be selected independently of the segment width.

The structure of the composite pane according to the invention enables the active layer to be selectively switched in sections, with the selectively switchable regions of the active layer corresponding to a projection of the segments of the first surface electrode onto the active layer. For the selective control of the segments, the opposing poles of a voltage source are connected, depending on the desired circuit diagram of the active layer, to the busbars of the first surface electrode and the second surface electrode. A first pole of the voltage source is connected to the second busbar(s) of the second surface electrode, whereas the opposite pole of the voltage source is connected to the first busbars, which are contacted in the region of the segments of the first surface electrode to be controlled. Consequently, there is an electrical potential difference between the surface electrodes only in the regions of the functional element in which the corresponding segments of the first surface electrode are connected to the voltage source. Accordingly, the active layer of the functional element is also switched only in these regions. The separating line between the individual segments of the first surface electrode ensures that no current flow occurs via other segments of the coating. The selective control of the segments of the first surface electrode to which a voltage is applied is done, for example, via an external control unit.

The arrangement according to the invention enables the length of the first busbars to exceed the width of the associated segments of the first surface electrode, as a result of which the reliability of the functional element can be significantly improved and the risk of failure of the glazing can be minimized. In particular, in the case of busbars with short length, as is usually the case of functional elements switchable in segments, the risk of failure of a busbar due to overheating is increased. Using longer first busbars can provide a remedy.

The functional element has multiple side edges, particularly preferably four side edges. The functional element can, however, also include more than four side edges. In each case, at least two side edges of the functional element are positioned opposite one another, essentially in pairs. In the case of an embodiment with four side edges, this yields two pairs of two opposite side edges each. The opposite side edges of a functional element can run parallel to one another or nonparallel. The side edges need not be straight, but often have a curve. The length of opposite side edges can differ from one another. For example, the functional element can have a trapezoidal outline. In a preferred embodiment, the functional element has multiple side edges, for example, four side edges. The first busbars run, in each case, adjacent the corresponding side edge associated therewith.

In a particularly advantageous embodiment of the invention, the at least one separating line runs meanderingly between two opposite side edges of the functional element. The separating line has vertical sections that run essentially parallel to the nearest first busbars and horizontal sections that run essentially parallel to the at least one second busbar. The distance between adjacent horizontal sections defines the segment width. In contrast, the arrangement of the vertical sections determines which first busbar is associated with which segment. When the contacting of the corresponding segment is to be done via this first busbar, there is no vertical section of the separating line between the busbar and the segment surface. When the contacting has already been done via a different busbar, other first busbars located in the vicinity of this segment are electrically separated from this segment by a vertical section of the separating line. The first busbars are arranged between the vertical sections of the separating line and the side edge adjacent these vertical sections. This yields, in each case, an edge region adjacent these side edges with first busbars in which the first busbars can be dimensioned in terms of their length independently of the width of the associated segment. A separating line with a meandering course represents a readily realizable option for achieving such structuring of the surface electrode. However, other cutting patterns with one or more separating lines that effect the electrical contacting according to the invention are also conceivable.

The separating lines that separate the first busbars adjacent one another at a common side edge of the functional element from one another preferably run as horizontal separating lines between the corresponding side edge of the functional element and the nearest vertical section of a meandering separating line.

In each case, the length of the first busbars is preferably between 120% and 300%, preferably at least 150%, of the width of the segment that is contacted by these busbars. As a result of the fact that the first busbars protrude beyond the width of the segment contacted in this manner, the length of the first busbars is maximized. This is advantageous for achieving the greatest possible robustness of the first busbars and good voltage distribution.

The segments of the first surface electrode are arranged essentially parallel to one another, with the segments extending continuously from one side edge of the functional element to an opposite side edge.

The number of segments within the first surface electrode can vary depending on the field of application of the glazing and is usually between 2 and 20, preferably between 3 and 10.

In a first preferred embodiment, only one second busbar, via which the entire second surface electrode is electrically conductively contacted, is attached to the second surface electrode. This is, for example, advantageous when the functional element does not extend over the entire surface of the glazing and one edge of the functional element is positioned in the through-vision region of the glazing. A second busbar is dispensed with on this side edge in the interest of attractive optics.

In a second preferred embodiment, the functional element has at least one further second busbar, as a result of which more homogeneous voltage distribution and more uniform switching behavior are achieved. In the interest of homogeneous voltage distribution, the second busbars are preferably arranged on opposite side edges of the functional element. Particularly preferably, the second surface electrode has exactly two second busbars opposite one another, as a result of which the length of the busbars can in each case be maximized along the side edge of the functional element.

In both embodiments described, the length of the at least one second busbar is at least 70%, preferably at least 90% of the length of the nearest side edge of the functional element, with the busbars arranged in the vicinity of one of the side edges of the functional element. Preferably, the second busbars are arranged on the side edge(s) of the functional element on which no first busbars are situated. Such an arrangement of the first and second busbars busbar at different side edges of the functional element enables easy attachment of the busbars on the surface electrodes, which will be discussed in detail within the method for producing the composite pane according to the invention.

The electrical contacting of the busbars to an external power source is realized by suitable connecting cables, for example, foil conductors. Suitable external control elements for controlling the individual segments are known to the person skilled in the art.

The electrical control of the functional element is done, for example, by knobs, rotary controls, or sliders, that are, for example, integrated into the dashboard of a vehicle. However, a switch area, for example, a capacitive switch area, for control can also be integrated into the composite pane. Alternatively, the functional element can also be controlled by contactless methods, for example, by gesture recognition, or as a function of the pupil or eyelid state detected by a camera and suitable evaluation electronics.

The at least one separating line is introduced into the surface electrodes such that the segments of the first surface electrode are electrically isolated from one another. The individual segments are connected to the voltage source independently of one another such that they can be actuated separately. Thus, different regions of the functional element can be switched independently. Particularly preferably, the segments are arranged horizontally in the installed position. Thus, the height of the non-transparent region of the functional element can be controlled by the user. The term "horizontal" is construed broadly here and refers to a propagation direction that runs between the side edges of the composite pane, for example, the side edges of a windshield or roof panel. The separating lines need not necessarily be straight, but, instead, can even be slightly curved, preferably adapted to any curvature of the nearest pane edge, in particular essentially parallel to the front roof edge of a windshield. Of course, vertical separating lines are also conceivable.

The separating lines have, for example, a width of 5 μm to 500 μm, in particular 20 μm to 200 μm. The width of the segments, i.e., the distance between adjacent separating lines, can be suitably selected by the person skilled in the art in accordance with the requirements in the individual case.

The separating lines can be introduced by a laser ablation, mechanical cutting, or etching during production of the functional element. Already laminated multilayer films can also be subsequently segmented by laser ablation.

The busbars are, for example, connected to the surface electrodes as strips of an electrically conductive material or electrically conductive imprints. Preferably, the busbars are implemented as electrically conductive imprints including silver.

The busbars are in each case attached flat on the first surface electrode and the second surface electrode. This is advantageous in terms of easy attachment of the busbars. Moreover, in terms of its mechanical stability, flat contacting is preferable to contacting via the surface cross-section. The busbars run in the vicinity of the side edges of the functional element and are in each case attached flat on the surface electrode to be contacted, with a busbar not necessarily having to be arranged on each side edge of the functional element.

The busbars preferably have, in each case, a distance of 1 mm to 50 mm, particularly preferably of 1 mm to 5 mm, from the nearest side edge of the functional element.

The side edges of the functional element in the vicinity of which busbars are situated on the functional element are preferably arranged at a distance of 0 mm to 100 mm, preferably 1 mm to 50 mm, particularly preferably 1 mm to 20 mm, from the circumferential edge of the composite pane. As a result, the pane area equipped with the functional element is advantageously enlarged. Furthermore, the busbars can, in this manner, be concealed by the circumferential masking print customary in the automotive sector in edge region of windshields and roof panels. Side edges of a functional element on which there are no busbars can, for example, also be positioned in the region of the composite pane that is visible after installation.

In an advantageous embodiment, the functional element is a PDLC functional element (polymer dispersed liquid crystal). The active layer of a PDLC functional element contains liquid crystals that are embedded in a polymer matrix. When no voltage is applied to the surface electrodes, the liquid crystals are aligned in a disorderly manner, resulting in strong scattering of the light passing through the active layer. When a voltage is applied to the surface electrodes, the liquid crystals align themselves in a common direction and the transmittance of light through the active layer is increased. Such a functional element is known, for example, from DE 102008026339 A1.

The advantages mentioned occur, however, not only in connection with PDLC elements, but, analogously, a longer service life is also to be expected with other functional elements. In other possible embodiments, the active layer is an SPD, an electrochromic, or an electroluminescent layer.

An SPD (suspended particle device) functional element contains an active layer comprising suspended particles, with the absorption of light by the active layer being variable by application of a voltage to the surface electrodes. The change in absorption is based on the alignment of the rod-shaped particles in the electric field when electric voltage is applied. SPD functional elements are known, for example, from EP 0876608 B1 and WO 2011033313 A1.

In an electrochromic functional element, the active layer of the functional element is an electrochemically active layer. The transmittance of visible light depends on the rate of ion storage in the active layer, with the ions provided, for example, by an ion storage layer between an active layer and a surface electrode. The transmittance can be influenced by the voltage applied to the surface electrodes, which causes a migration of the ions. Suitable functional layers contain, for example, at least tungsten oxide or vanadium oxide. Electrochromic functional elements are known, for example, from WO 2012007334 A1, US 20120026573 A1, WO 2010147494 A1, and EP 1862849 A1.

In electroluminescent functional elements, the active layer contains electroluminescent materials, in particular organic electroluminescent materials whose luminescence is stimulated by the application of a voltage. Electroluminescent functional elements are known, for example, from US 2004227462 A1 and WO 2010112789 A2. The electroluminescent functional element can be used as a simple light source or as a display with which any displays can be shown.

In a particularly preferred embodiment, the composite pane is a windshield of a motor vehicle. The windshield has an upper edge and a lower edge as well as two side edges extending between the upper edge and the lower edge. The upper edge, the lower edge, and the two side edges form together the circumferential edge of the composite pane. The term "upper edge" refers to that edge which is intended, in the installed position, to point upward in the direction of the vehicle roof. The upper edge is usually referred to as the "roof edge" or "front roof edge". The term "lower edge" refers to that edge which is intended, in the installed position, to point downward toward the hood of the vehicle. The lower edge is generally referred to as the "engine edge". The side edges of the windshield are the pane edges adjacent the so-called "A pillars" of the vehicle body in the installed state.

Windshields have a central field of vision whose optical quality is subject to stringent requirements. The central field of vision must have high light transmittance (typically greater than 70%). Said central field of vision is, in particular, that field of vision that is referred to by the person skilled in the art as the field of vision B, vision region B, or zone B. The field of vision B and its technical requirements are specified in Regulation No. 43 of the Economic Commission for Europe of the United Nations (UN/ECE) (ECE-R43, "Uniform Provisions Concerning the Approval of Safety Glazing Materials and Their Installation on Vehicles"). The field of vision B is defined there in Annex 18.

In this embodiment of the windshield, the functional element is a sun visor and is arranged above the central field of vision (field of vision B). This means that the functional element is arranged in the region between the central field of vision and the front roof edge of the windshield. The functional element need not cover the entire region but is positioned completely within this region and does not protrude into the central field of vision. In other words, the functional element is nearer the upper edge of the windshield than the central field of vision. Thus, the transmittance of the central field of vision is not impaired by the functional element, which is situated at a position similar to that of a conventional mechanical sun visor in the downward pivoted state.

The intermediate layer in the central field of vision of the windshield is clear and transparent. This ensures that the through-vision through the central field of vision is unrestricted such that the pane can be used as a windshield. The term "a transparent thermoplastic layer" means a layer with light transmittance in the visible spectral range of at least 70%, preferably at least 80%. The transparent intermediate layer is present at least in the field of vision A, preferably also in the field of vision B per ECE-R43.

The windshield is preferably intended for a motor vehicle, particularly preferably for a passenger car.

The functional element as a sun visor has multiple lamellae, which correspond in their dimensions and arrangement to the segments of the first surface electrode and can be switched selectively. At least one separating line, whose horizontal section runs essentially parallel to the front roof edge and divides the surface electrode into at least three segments, is introduced into the first surface electrode. The segments thus extend between the two side edges of the windshield. Each segment of the first surface electrode is in each case contacted by a first busbar that is attached on the first surface electrode of the functional element in the vicinity of the side edges of the windshield. The second surface electrode of the functional element is contacted via a second busbar, which is arranged adjacent the front roof edge of the windshield. The second busbar runs essentially parallel to the front roof edge. The first busbars situated at the side edges and the second busbar arranged at the roof edge are concealed in the edge region of the pane by the opaque masking print customarily used for windshields. The windshield thus has an electrically switchable sun visor with homogeneous switching behavior, a low risk of failure, and an attractive appearance.

In one possible embodiment, a region of the thermoplastic intermediate layer, via which the functional element is joined to the outer pane or the inner pane, is tinted or colored. The transmittance of this region in the visible spectral range is thus reduced compared to a non-tinted or non-colored layer. The tinted/colored region of the thermoplastic intermediate layer thus lowers the transmittance of the windshield in the region of the sun visor. In particular, the aesthetic impression of the functional element is improved because the tinting results in a neutral appearance that is more pleasant to the observer.

The tinted or colored region of the thermoplastic intermediate layer preferably has transmittance in the visible spectral range of 10% to 50%, particularly preferably of 20% to 40%. Particularly good results in terms of protection against dazzling and optical appearance are thus achieved.

A windshield with an electrically adjustable sun visor comprises at least an outer pane and an inner pane that are joined to one another via an intermediate layer. The windshield is intended, in a window opening of a vehicle, to separate the interior from the external environment. In the context of the invention, "inner pane" means the pane of the windshield facing the interior (vehicle interior). "Outer pane" means the pane facing external environment. The first pane and the second pane of the composite pane according to the invention are the inner pane and the outer pane of such a windshield.

In another preferred embodiment of the composite pane according to the invention, it is used as a roof panel of a motor vehicle. The roof panel comprises a front roof edge that is adjacent the windshield of the vehicle, a rear roof edge that points in the direction of the rear window, and two side edges that extend along the vehicle doors between the front roof edge and the rear roof edge. The functional element is designed as large-area shading of the roof panel, wherein the functional element is arranged on an area of at least 80% of the entire through-vision region of the roof panel, preferably at least 90%, for example, 100%, of the entire through-vision region.

The functional element as roof shading likewise has multiple lamellae, which correspond in their dimensions and arrangement to the segments of the first surface electrode and can be switched selectively. The segments of such a vehicle roof are substantially larger in area than in sun visors. The functional element is arranged such that the side edges of the functional element run essentially parallel to the respective nearest edge (front roof edge, rear roof edge, side edges) of the composite pane. At least one separating line that runs essentially parallel to the front roof edge of the composite pane and divides the surface electrode into at least two segments is introduced into the first surface electrode. The functional element is preferably divided into 2 to 6, particularly preferably into 3 to 4 lamellae, wherein the lamellae run essentially orthogonal to the direction of travel of the vehicle. The segments thus extend between the two side edges of the roof panel and the separating lines run from one side edge in the direction of the other side edge. Each segment of the first surface electrode is contacted by a first busbar, which is attached, in the vicinity of the side edges, on the first surface electrode. The second surface electrode of the functional element is contacted via two second busbars, which are arranged adjacent the front roof edge and the rear roof edge. Here, the second busbars run essentially parallel to the nearest roof edge (front roof edge or rear roof edge). The first busbars situated at the side edges and the second busbars arranged at the roof edges are concealed by the opaque masking print customarily used in the edge region of the pane. Thus, the roof panel with a switchable functional element as well has homogeneous switching behavior, a low risk of failure, and an attractive appearance.

In a preferred embodiment of the roof panel, the region of the thermoplastic intermediate layer, via which the functional element is joined to the outer pane or to the inner pane, is tinted or colored. The transmittance of this region in the visible spectral range is thus reduced compared to a non-tinted or non-colored layer. The tinted/colored region of the thermoplastic intermediate layer thus lowers the transmittance of the windshield in the region of the sun visor. The tinted or colored region of the thermoplastic intermediate layer preferably has transmittance in the visible spectral range of 10% to 50%, particularly preferably of 20% to 40%. This achieves particularly good results in terms of glare protection and optical appearance.

The first pane and the second pane of the composite pane according to the invention constitute the inner pane and the outer pane of the roof panel.

The first busbar and the second busbar comprise an electrically conductive structure, preferably containing silver, and have a thickness of 5 µm to 40 µm.

The busbars are intended to be connected to an external voltage source such that there is a difference in electrical potential between the first surface electrode and the second surface electrode.

The attachment of the busbars can be done in particular by placement, printing, soldering, or gluing.

In a preferred embodiment, the busbars are implemented as a printed and burnt-in conductive structure. The printed busbars contain at least one metal, preferably silver. The electrical conductivity is preferably realized via metal particles contained in the busbar, particularly preferably via silver particles. The metal particles can be situated in an organic and/or inorganic matrix such as pastes or inks, preferably as burnt screen printing paste with glass frits. The layer thickness of the printed busbars is preferably from 5 µm to 40 µm, particularly preferably from 8 µm to 20 µm, and most particularly preferably from 10 µm to 15 µm. Printed busbars with these thicknesses are technically simple to realize and have advantageous current carrying capacity.

Alternatively, the busbars are implemented as strips of an electrically conductive film. In that case, the busbars contain, for example, at least aluminum, copper, tinned copper, gold, silver, zinc, tungsten, and/or tin or alloys thereof. The strip preferably has a thickness of 10 µm to 500 µm, particularly preferably of 30 µm to 300 µm. Busbars made of electrically conductive films with these thicknesses are technically simple to realize and have advantageous current carrying capacity. The strip can be electrically conductively connected to the surface electrode, for example, via a soldering compound, via an electrically conductive adhesive or an electrically conductive adhesive tape, or by direct placement. To improve the conductive connection, a silver-containing paste, for example, can be arranged between the surface electrode and the busbar.

The first surface electrode and the second surface electrode are formed in each case by an electrically conductive layer. These electrically conductive layers contain at least a metal, a metal alloy, or a transparent conductive oxide, preferably a transparent conductive oxide, and have a thickness of 10 nm to 2 µm. The surface electrodes are preferably transparent. Here, "transparent" means permeable to electromagnetic radiation, preferably electromagnetic radiation of a wavelength from 300 nm to 1.300 nm and, in particular, to visible light. Electrically conductive layers according to the invention are known, for example, from DE 20 2008 017 611 U1, EP 0 847 965 B1, or WO2012/052315 A1. They typically contain one or more, for example, two, three, or four electrically conductive, functional individual layers. The functional individual layers preferably contain at least one metal, for example, silver, gold, copper, nickel, and/or chromium, or a metal alloy. The functional individual layers particularly preferably contain at least 90 wt.-% of the metal, in particular at least 99.9 wt.-% of the metal. The functional individual layers can be made of the metal or the metal alloy. The functional individual layers particularly preferably contain silver or a silver-containing alloy. Such functional individual layers have particularly advantageous electrical conductivity with, at the same time, high transmittance in the visible spectral range. The thickness of a functional individual layer is preferably from 5 nm to 50 nm, particularly preferably from 8 nm to 25 nm. In this thickness range, advantageously high transmittance in the visible spectral range and particularly advantageous electrical conductivity are achieved.

The surface electrodes can in principle be formed by any electrically conductive layer that can be electrically contacted.

The functional element is preferably a multilayer film with two outer carrier films. In such a multilayer film, the surface electrodes and the active layer are arranged between the two carrier films. Here, "outer carrier film" means that the carrier films form the two surfaces of the multilayer film. The functional element can thus be provided as a laminated film that can be processed advantageously. The functional element is advantageously protected against damage, in particular, corrosion, by the carrier films. The multilayer film contains, in the order indicated, at least one first carrier film, one first surface electrode, one active layer, one second surface electrode, and one second carrier film.

Preferably, the first carrier film and/or the second carrier film contain(s) at least one polymer that does not fully melt in the autoclave process, preferably polyethylene terephthalate (PET). Particularly preferably, the first and the second carrier film are made of a PET film. This is particularly advantageous in terms of the stability of the multilayer film. The carrier films can, however, also contain, for example, ethylene vinyl acetate (EVA) and/or polyvinyl butyral (PVB), polypropylene, polycarbonate, polymethyl methacrylate, polyacrylate, polyvinyl chloride, polyacetate resin, casting resins, acrylates, fluorinated ethylene-propylenes, polyvinyl fluoride, and/or ethylene tetrafluoroethylene. The thickness of each carrier film is preferably from 0.1 mm to 1 mm, particularly preferably from 0.1 mm to 0.2 mm. The carrier films according to the invention are preferably transparent. The surface electrodes are preferably arranged on one surface of the carrier film, i.e., on exactly one of the two sides of the carrier film (i.e., on its front side or its rear side). The carrier films are oriented in the layer stack of the multilayer film such that the surface electrodes are arranged adjacent the active layer.

In the context of the invention, the term "electrically adjustable optical properties" means those properties that are infinitely adjustable, but also those that can be switched between two or more discrete states.

In addition to the active layer and the surface electrodes, the functional element can, of course, have other layers known per se, for example, barrier layers, blocking layers, antireflection layers, protective layers, and/or smoothing layers.

Functional elements as multilayer films are commercially available. The functional element to be integrated is typically cut in the desired shape and size from a multilayer film of larger dimensions. This can be done mechanically, for example, with a knife. In an advantageous embodiment, the cutting is done using a laser. It has been demonstrated that, in this case, the side edge is more stable than with mechanical cutting. With mechanically cut side edges, there can be a risk that the material will pull back, which is visually conspicuous and adversely affects the aesthetics of the pane.

In an advantageous embodiment, the functional element has edge sealing. The edge sealing circumferentially covers the side edge of the functional element and prevents, in particular, the diffusion of chemical components of the thermoplastic intermediate layer, for example, plasticizers, into the active layer. At least along the lower edge of the functional element, which is visible in through-vision in windshields, and preferably, along all side edges, the edge sealing is formed by a transparent colorless adhesive or a transparent colorless adhesive tape. For example, acrylic or silicon-based adhesive tapes can be used as edge sealing. The transparent colorless edge sealing has the advantage that the edge of the functional element is not distractingly conspicuous during through-vision through the windshield. Preferably, such an edge sealing is also used with non-visible side edges, for example, in the case of roof panels or at the edge regions of the windshield that are concealed by masking print.

The functional element is integrated between the first pane and the second pane of the composite pane via an intermediate layer. The intermediate layer preferably comprises a first thermoplastic laminating film, which bonds the functional element to the first pane, and a second thermoplastic laminating film, which bonds the functional element to the second pane. Typically, the intermediate layer is formed by at least the first and the second thermoplastic laminating film, which are arranged flat one over another and are laminated to one another, with the functional element inserted between the two layers. The regions of the laminating films overlapping the functional element then form the regions that bond the functional element to the panes. In other regions of the pane where the thermoplastic laminating films make direct contact, they can fuse during lamination such that the two original layers are no longer discernible and, instead, there is a homogeneous intermediate layer.

A thermoplastic laminating film can, for example, be formed by a single thermoplastic film. A thermoplastic laminating film can also be formed from sections of different thermoplastic films whose side edges are adjacent. In addition to a first thermoplastic laminating film or a second thermoplastic laminating film, additional thermoplastic laminating films can also be present. These can, if need be, also be used for embedding additional films comprising functional layers, for example, infrared-reflecting layers or acoustically damping layers.

The thermoplastic laminating films can, as already discussed using the example of windshields and roof panels, also include tinted or colored regions. Such films can be obtained, for example, by coextrusion. Alternatively, an untinted film segment and a tinted or colored film segment can be combined to form a thermoplastic laminating film. The tinted or colored region can be homogeneously colored or tinted, in other words, can have location-independent transmittance. However, the tinting or coloring can also be inhomogeneous; in particular, a transmittance progression can be realized. In one embodiment of the windshield, the transmittance level in the tinted or colored region decreases at least in sections with increasing distance from the upper roof edge. Thus, sharp edges of the tinted or colored region can be avoided such that the transition from the sun visor to the transparent region of the windshield is gradual, which appears more attractive aesthetically.

In an advantageous embodiment, the region of the thermoplastic composite pane oriented in the direction of a pane used as an outer pane of the vehicle, i.e., the region between the functional element and the outer pane, is tinted. This creates a particularly aesthetic impression of the vehicle observed from the outside. The region of the other thermoplastic composite pane between the functional element and the inner pane can, optionally, be additionally colored or tinted.

In a preferred embodiment, the functional element, more precisely the side edges of the functional element, is circumferentially surrounded by a thermoplastic frame film. The frame film is implemented like a frame with a recess into which the functional element is inserted. The thermoplastic frame film can be formed by a thermoplastic film in which the recess had been cut out. Alternatively, the thermoplastic frame film can also be composed of a plurality of film sections around the functional element. Thus, the intermediate layer is formed, in a preferred embodiment, from a total of at least three thermoplastic laminating films arranged flat one over another, wherein the frame film, as the middle layer, has a recess in which the functional element is arranged. During production, the thermoplastic frame film is arranged between the first and the second thermoplastic laminating film, with the side edges of all thermoplastic films preferably situated congruently. The thermoplastic frame film preferably has roughly the same thickness as the functional element. This compensates for the local difference in thickness of the windshield, which is introduced by the locally limited functional element, such that glass breakage during lamination can be avoided.

The side edges of the functional element visible in through-vision through the composite pane are preferably arranged flush with the thermoplastic frame film such there is no gap between the side edge of the functional element and the associated side edge of the thermoplastic frame film. This is true in particular for the lower edge of a functional element as a sun visor of a windshield, in which this edge is typically visible. Thus, the boundary between the thermoplastic frame film and the functional element is visually less conspicuous.

Automobile glazings, in particular windshields, rear windows, and roof panels, usually have a surrounding peripheral masking print made of an opaque enamel, which serves in particular to protect the adhesive used for installation of the pane against UV radiation and to obscure it visually. This peripheral masking print is preferably also used to obscure the edges of the functional element that are situated in the edge region of the glazing. The busbars and the required electrical connections are also installed in the region of the masking print. In this manner, the functional element is advantageously integrated into the appearance of the composite pane. Preferably, at least the pane used as the outer pane has such a masking print; particularly preferably, both the first pane and the second pane (inner pane and outer pane) are printed such that through-vision is prevented from both sides.

The functional element can also have recesses or holes, for instance, in the region of so-called sensor windows or camera windows. These regions are provided to be equipped with sensors or cameras whose function would be impaired by a controllable functional element in the beam path, for example, rain sensors.

The functional element is preferably arranged over the entire width of the composite pane, minus an edge region on both sides with a width of, for example, 2 mm to 20 mm. The functional element preferably also has a distance from the upper edge of, for example, 2 mm to 20 mm. The functional element is thus encapsulated within the intermediate layer and is protected against contact with the surrounding atmosphere and against corrosion.

The first thermoplastic laminating film and the second thermoplastic laminating film and, optionally, the thermoplastic frame film as well, preferably contain at least polyvinyl butyral (PVB), ethylene vinyl acetate (EVA), and/or polyurethane (PU), particularly preferably PVB.

The thickness of each thermoplastic laminating film as well as the frame film is preferably from 0.2 mm to 2 mm, particularly preferably from 0.3 mm to 1 mm, in particular from 0.3 mm to 0.5 mm, for example, 0.38 mm.

The first pane and the second pane are preferably made of glass, particularly preferably of soda lime glass, as is customary for window panes. The panes can, however, also be made of other types of glass, for example, quartz glass, borosilicate glass, or aluminosilicate glass, or of rigid clear plastics, for example, polycarbonate or polymethyl methacrylate. The panes can be clear, or also tinted or colored. If the composite pane is used as a windshield, it should have adequate light transmittance in the central field of vision, preferably at least 70% in the primary through-vision zone A per ECE-R43.

The outer pane, the inner pane, and/or the intermediate layer can have other suitable coatings that are known per se, for example, anti-reflecting coatings, non-stick coatings, anti-scratch coatings, photocatalytic coatings, or solar protection coatings or low-E coatings.

The thickness of the first pane and the second pane can vary widely and thus be adapted to the requirements in the individual case. The first pane and the second pane preferably have thicknesses of 0.5 mm to 5 mm, particularly preferably of 1 mm to 3 mm.

The invention also includes a method for producing a composite pane according to the invention, wherein at least
 a) one functional element is provided,
 b) at least one separating line, which divides the first surface electrode into at least two segments, is introduced into the first surface electrode of the functional element,
 c) in each case at least one first busbar per segment is attached on the first surface electrode,
 d) at least one second busbar is attached on the second surface electrode,
 e) at least one first thermoplastic laminating film is placed on a first pane, the functional element is placed on the first thermoplastic laminating film, at least one second thermoplastic laminating film and a second pane are arranged one over another in this order on the functional element,
 f) the first pane and the second pane are bonded by lamination, wherein an intermediate layer with an embedded functional element is formed from the first thermoplastic laminating film and the second thermoplastic laminating film.

The functional element is preferably provided in the form of a multilayer film comprising, in this order, a first carrier film, an active layer, and a second carrier film, wherein the surface electrodes are attached on the surfaces of the carrier films facing the active layer. The advantage of a multilayer film with electrically switchable optical properties resides in simple production of the glazing. The actual functional element is advantageously protected against damage, in particular corrosion, by the carrier films and can be prepared before production of the glazing even in relatively large quantities, which can be desirable for economic and technical processing reasons. The multilayer film can, during production of the composite pane, simply be inserted into the composite, which is then laminated using conventional methods.

The introduction of the at least one separating line in step b) is preferably done by a laser method. The separating lines are preferably generated by means of laser-induced degeneration within the surface electrodes. One such laser-induced degeneration is, for example, the removal of the surface electrode or a chemical change in the surface electrode. By means of the laser-induced degeneration, an interruption of the electrical conductivity of the layer is achieved. A pulsed solid-state laser is preferably used as the laser.

The separating lines are preferably produced through the carrier film nearest the surface electrode to be processed. The laser is focused through this carrier film onto the surface electrode.

The electrical contacting of the surface electrodes of the functional element is preferably done after introduction of the separating lines, but can optionally also take place before that.

The busbars are preferably realized in the form of a printed and burnt-in conductive structure. The printed busbars contain at least one metal, preferably silver. Suitable silver printing pastes are available commercially and are known to the person skilled in the art.

For the selective contacting of a surface electrode with a busbar, the surface electrode must first be exposed from the multilayer film. Here, in a first step, one carrier film of the multilayer film including the surface electrode situated on the carrier film is cut back. The active layer thus exposed is removed, for example, by mechanical abrasion using a solvent. After removal of the active layer, the adjacent surface electrode is exposed and can be electrically conductively contacted by printing the busbar.

When multiple busbars busbar are arranged near one another, as, for example, in the case of a group of first busbars along one edge, the stripping of the region to be contacted is usually done in one step for all busbars adjacent one another. In order to design the production process as simple as possible, even the region of the multilayer film between adjacent first busbars is stripped.

When the described contacting method is used, the contacting of the first and the second busbar is done on the first or second surface electrode starting from different surfaces of the multilayer film. Thus, for the contacting of a first surface electrode on a first carrier film, the second carrier film is cut back, the active layer is removed, and the busbars are attached from the side of the removed second carrier film. Analogously, for the contacting of the second surface electrode on the second carrier film, the first carrier film is cut back. Accordingly, the first busbars and the second busbars are not positioned congruently when this method is used.

The busbars are provided, in a manner known to the person skilled in the art, with connection cables, for example, in the form of flat conductors that are routed out of the pane composite in order to be connected to an external power source.

Any prints present, for example, opaque masking prints and printed busbars for the electrical contacting of the functional element are preferably applied by screen printing.

For incorporating the functional element into a composite pane, a layer stack of the individual components is first created. For this, a first pane and a second pane, which function as the inner pane and the outer pane of the composite pane, are provided. These can be planar or curved, preferably congruently curved. At least one first thermoplastic laminating film is placed on a first pane. The functional element is placed on the first thermoplastic laminating film. Optionally, a thermoplastic frame film that surrounds the functional element like a passepartout can be added. Arranged on the functional element, one over another are at least one second thermoplastic laminating film and a second pane. Optionally, in addition to the thermoplastic laminating films mentioned, further thermoplastic laminating films and/or carrier films with functional layers can also be inserted into the composite.

The first pane and the second pane are bonded by lamination to form a composite pane. The lamination is preferably done under the action of heat, vacuum, and/or pressure. It is possible to use lamination methods known per se, for example, autoclave methods, vacuum bag methods, vacuum ring methods, calender methods, vacuum laminators, or combinations thereof.

The invention also includes the use of a composite pane according to the invention as building glazing or vehicle glazing, preferably as vehicle glazing, in particular as a windshield or roof panel of a motor vehicle.

Figure 1B:
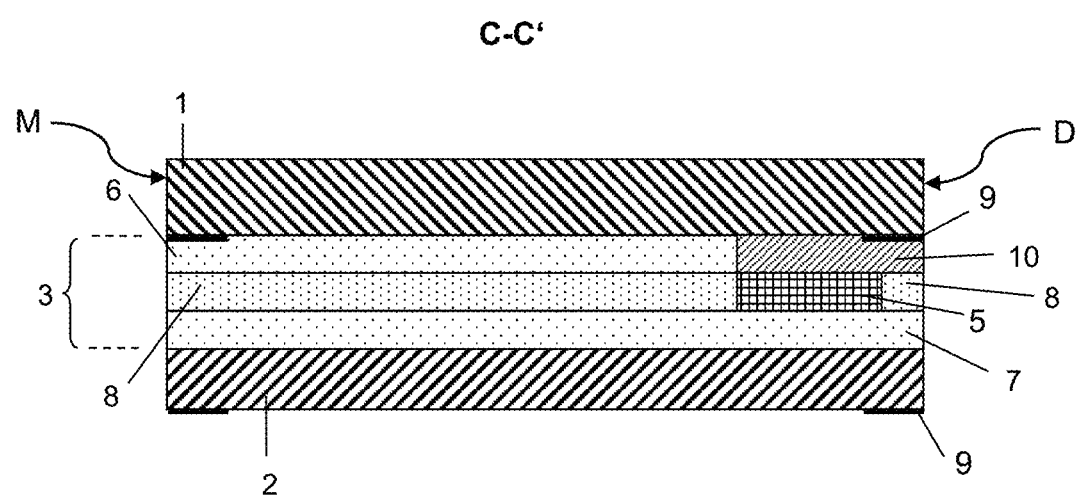
Figure 2A:
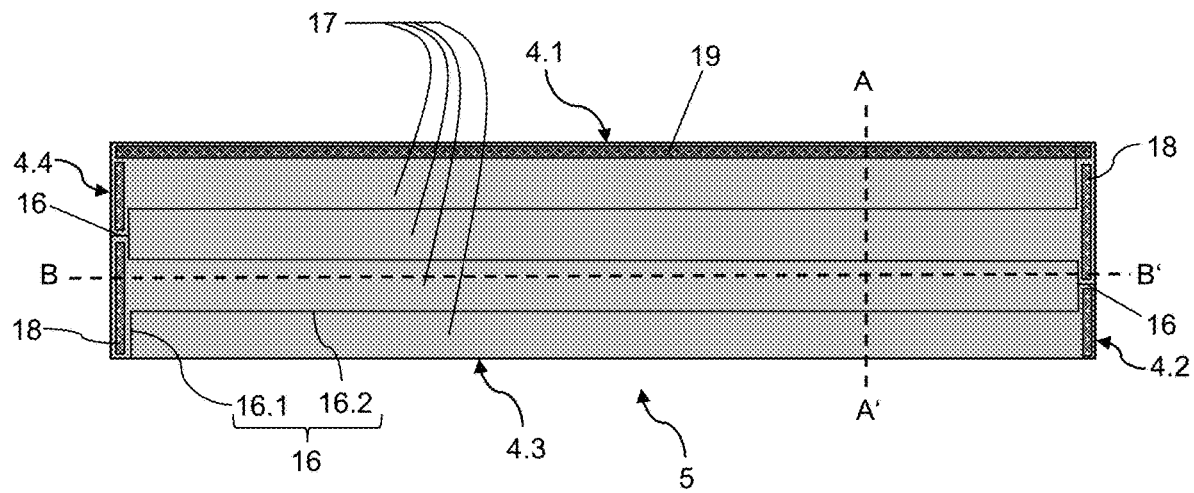
Figure 2B:
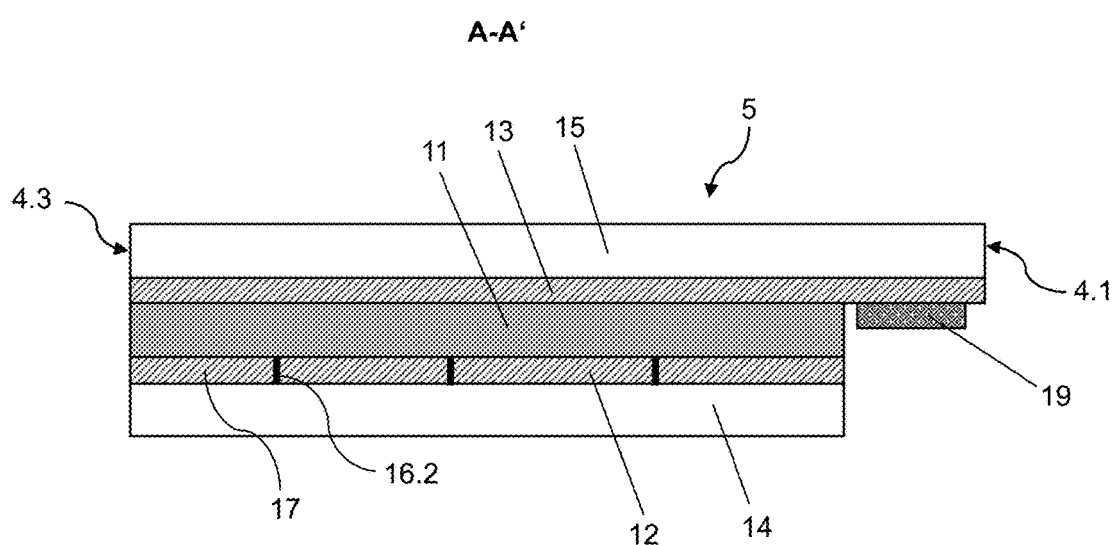
Figure 2C:
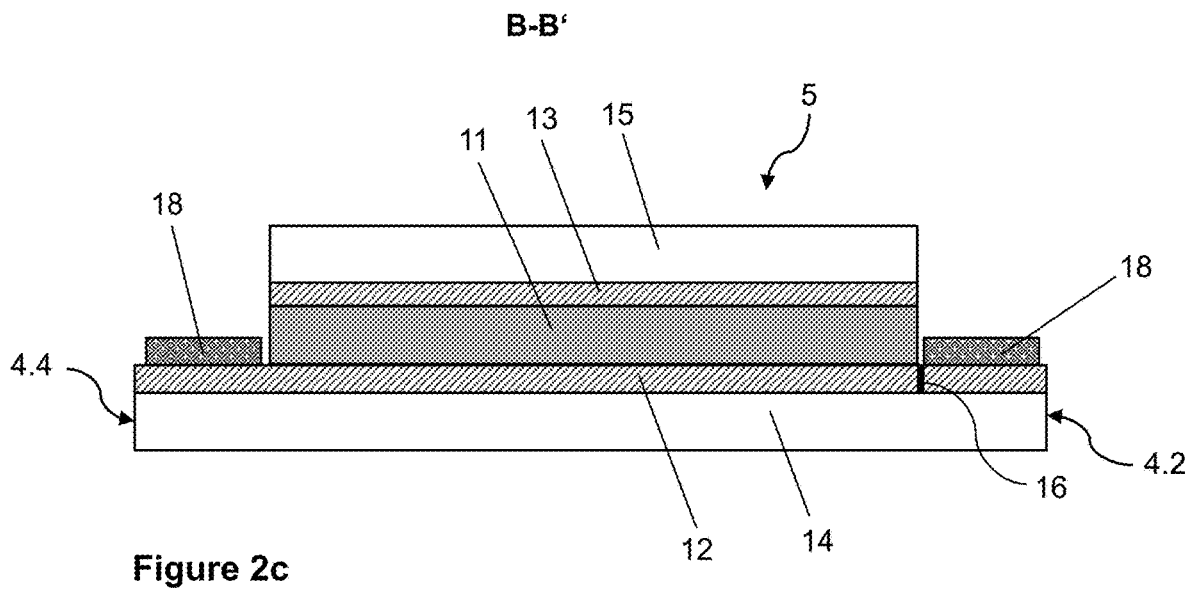
Figure 3:
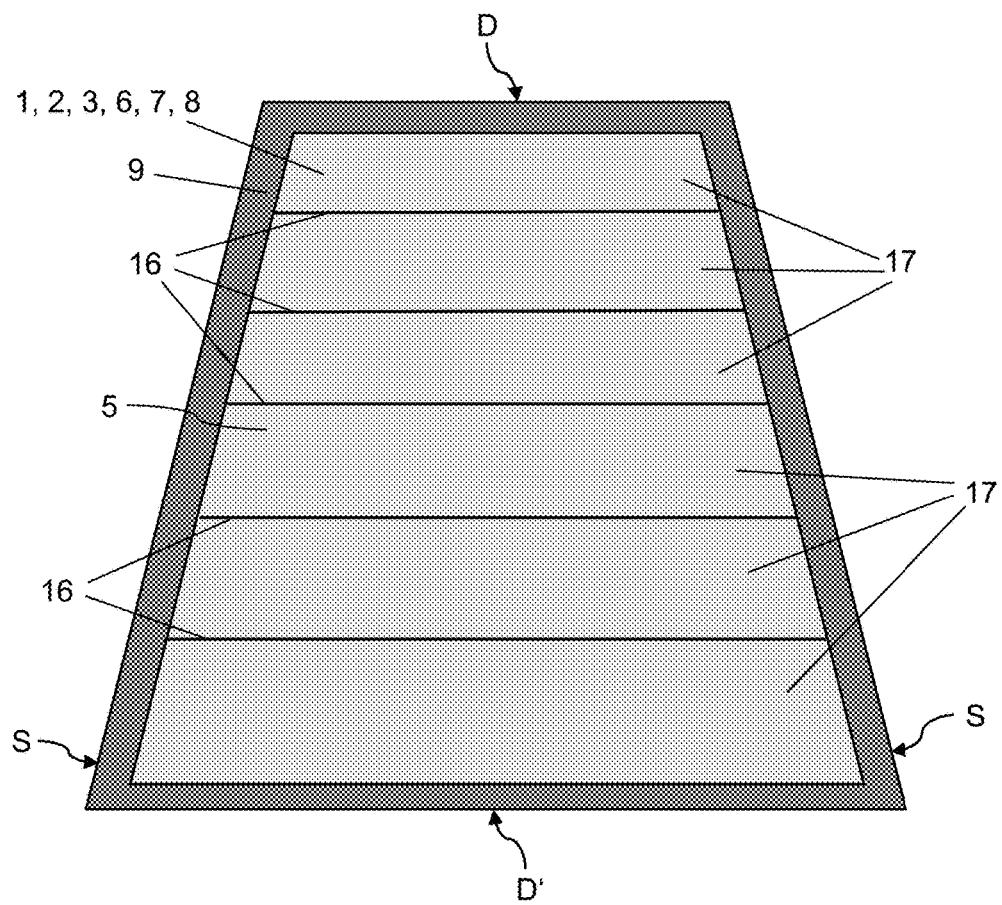
Figure 4A:
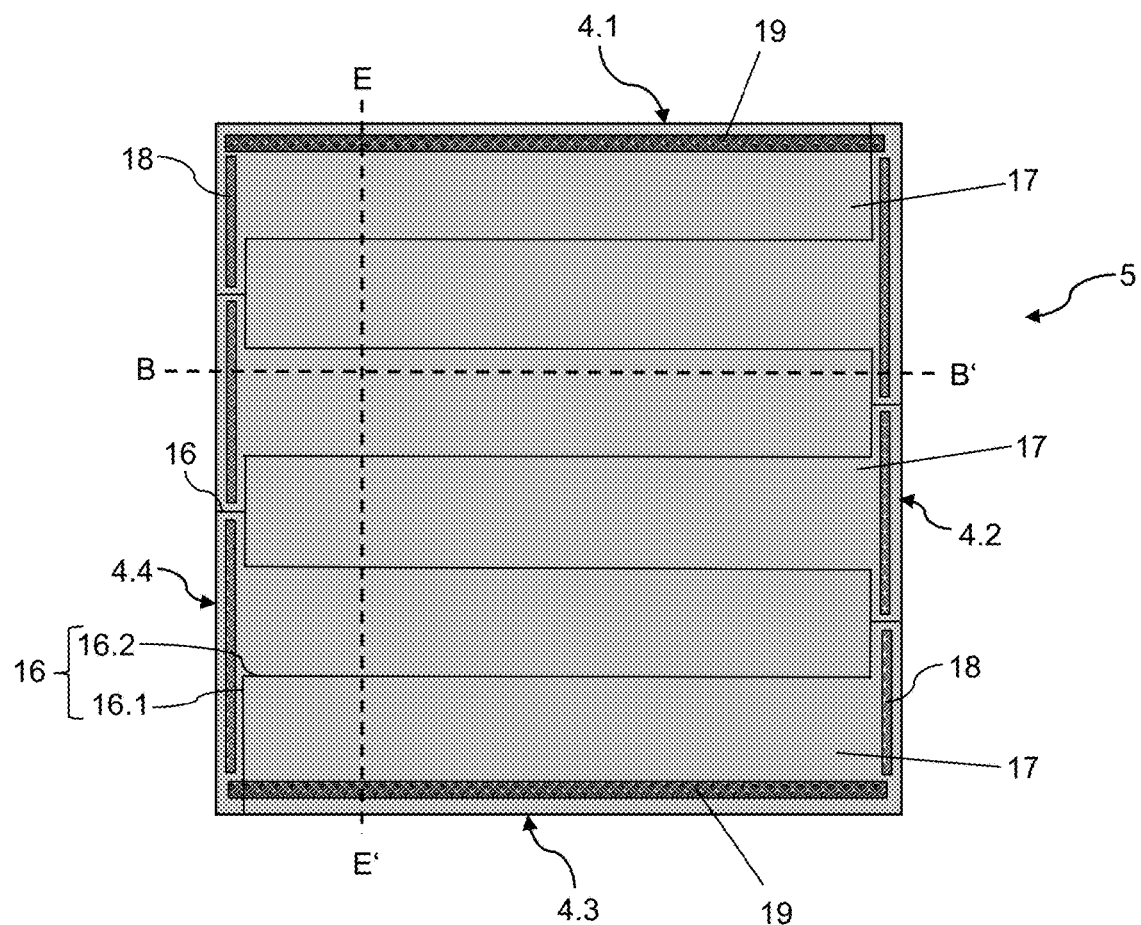
Figure 4B:
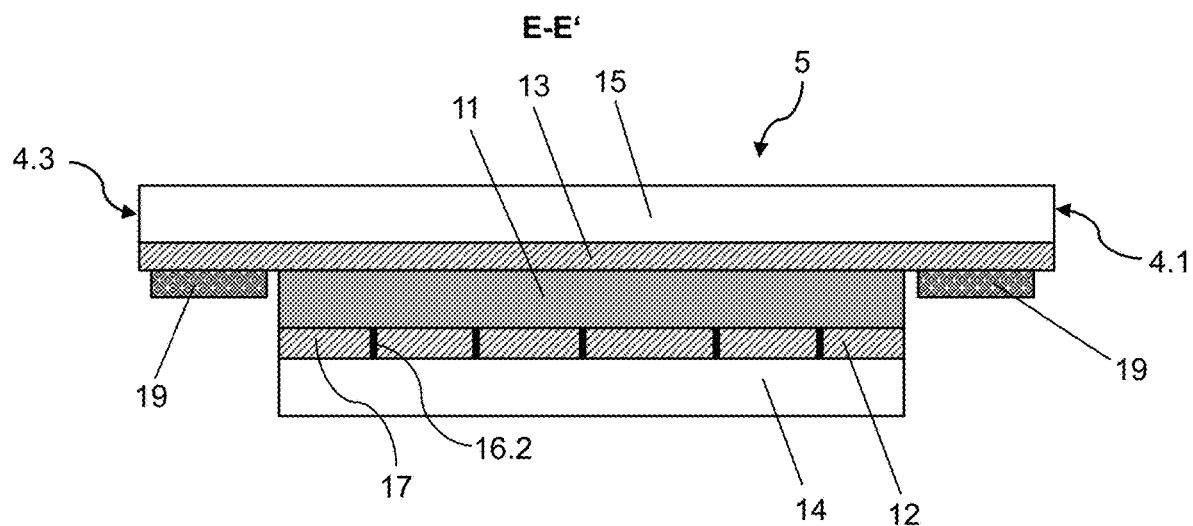
Figure 5:
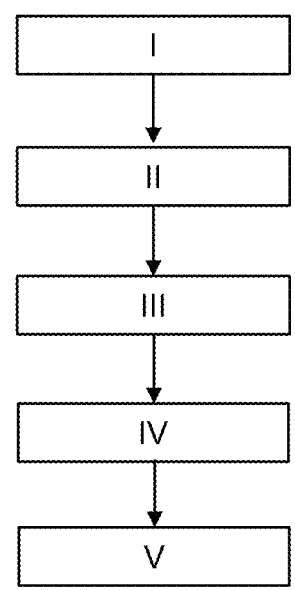

The invention is explained in detail with reference to drawings and exemplary embodiments. The drawings are schematic representations and are not to scale. The drawings in no way restrict the invention. They depict:

FIG. 1a a plan view of an embodiment of a windshield according to the invention, FIG. 1b a cross-section through the windshield according to the invention of FIG. 1a along the section line CC', FIG. 2a the functional element 5 of the windshield of FIGS. 1a and 1b, FIG. 2b a cross-section through the functional element 5 of FIG. 2a along the section line AA', FIG. 2c a cross-section through the functional element 5 of FIG. 2a along the section line BB', FIG. 3 a plan view of an embodiment of a roof panel according to the invention, FIG. 4a the functional element 5 of the roof panel of FIG. 3, FIG. 4b a cross-section through the functional element 5 of FIG. 3b along the section line EE', FIG. 5 an exemplary embodiment of the method according to the invention using a flowchart.

FIG. 1a depicts a plan view of a composite pane according to the invention, which is implemented as a windshield of a motor vehicle. FIG. 1b depicts a cross-sectional view of the windshield of FIG. 1a along the section line CC'. The windshield comprises a first pane 1, serving as an outer pane, and a second pane 2 as an inner pane. The inner pane is the pane directed toward the vehicle's interior, whereas the outer pane points toward the vehicle's surroundings. The first pane 1 and the second pane 2 are joined to one other via an intermediate layer 3. The first pane 1 has a thickness of 2.1 mm and is made of a green-colored soda lime glass. The second pane 2 has a thickness of 1.6 mm and is made of a clear soda lime glass. The composite pane as a windshield has a front roof edge D facing the roof in the installed position and an engine edge M facing the engine compartment in the installed position.

The windshield is equipped with a functional element 5 as an electrically adjustable sun visor that is installed in a region above the central field of vision B (as defined in ECE-R43). The sun visor is formed by a commercially available PDLC multilayer film as a functional element 5, which is integrated into the intermediate layer 3. The height of the sun visor is, for example, 21 cm. The intermediate layer 3 comprises a total of three thermoplastic laminating films 6, 7, 8, which are in each case implemented as a thermoplastic film with a thickness of 0.38 mm made of PVB. The first thermoplastic laminating film 6 is bonded to the first pane 1; the second thermoplastic laminating film 7, to the second pane 2. The thermoplastic frame film 8 positioned therebetween has a cutout, into which the cut-to-size PDLC multilayer film is inserted with an exact fit, in other words, flush on all sides. The third thermoplastic layer thus forms, so to speak, a sort of passepartout for the functional element 5, which is thus encapsulated all around in a thermoplastic material and is protected thereby. The first thermoplastic laminating film 6 optionally has a tinted region 10 that is arranged between the functional element 5 and the first pane 1. The light transmittance of the windshield is thus additionally reduced in the region of the sun visor and the milky appearance of the PDLC functional element 5 is mitigated in the diffusive state. The aesthetics of the windshield thus become significantly more attractive. In the case shown, the lower edges of the tinted region 10 and of the PDLC functional element 5 are arranged flush. This is, however, not necessarily the case.

The composite pane according to the invention has, in its embodiment as a windshield of FIG. 1*a*, a circumferential masking print 9, which conceals both the adhesive connection of the windshield to the vehicle body and the electrical contacting of the surface electrodes of the functional element 5. The circumferential peripheral masking print 9 is implemented by an opaque enamel on the interior-side surfaces (facing the interior of the vehicle in the installed position) of the first pane 1 and the second pane 2. The distance of the functional element 5 from the front roof edge D and the side edges of the windshield is less than the width of the masking print 9 such that the side edges 4.1, 4.2, 4.4 of the functional element 5—with the exception of the side edge 4.3 pointing toward the central field of vision B—are concealed by the masking print 9. The electrical connections and busbars are also reasonably attached in the region of the masking print 9 and thus advantageously concealed.

In a particularly convenient embodiment, the functional element 5 is controlled by a capacitive switch area arranged in the region of the sun visor, wherein the driver specifies the degree of darkening by means of the location at which he touches the pane. Alternatively, the sun visor can even be controlled by contactless methods, for example, by gesture recognition, or as a function of the pupil or eyelid state detected by a camera and suitable evaluation electronics.

The side edges of the functional element 5 are provided circumferentially with an edge seal (not shown) that is formed by a transparent acrylic adhesive tape. This prevents diffusion into or out of the active layer 11. Since the edge seal is transparent, the lower side edge, which is not concealed by the masking print 9, is also not distractingly visible. The edge seal runs circumferentially around the side edges of the multilayer film and extends, starting from the side edges, a few millimeters over the surfaces of the carrier films 14, 15 facing away from the active layer 11. The edge seal 10 prevents, in particular, the diffusion of plasticizers and other adhesive components of the thermoplastic frame film 8 into the active layer 11, as a result of which the aging of the functional element 5 is reduced.

A so-called "high flow PVB", which has stronger flow behavior compared to standard PVB films, can preferably be used for the thermoplastic laminating films 6, 7 and the thermoplastic frame film 8. The layers thus flow more strongly around the functional element 5, creating a more homogeneous visual impression, and the transition from the functional element 5 to the frame film 8 is less conspicuous. The "high flow PVB" can be used for all or for only one or more of the thermoplastic films 6, 7, 8 having direct contact with the functional element 5.

FIG. 2*a* depicts a plan view of the functional element 5 of the windshield of FIG. 1*a* before integration of the functional element 5 into the windshield, wherein the electrical contacting of the functional element 5 can also be seen. FIGS. 2*b* and 2*c* depict cross-sections through the functional element of FIG. 2*a* along the section lines AA' and BB', respectively. The adjustable functional element 5 is a multilayer film, consisting of an active layer 11 between two surface electrodes 12, 13 and two carrier films 14, 15. The active layer 11 contains a polymer matrix with liquid crystals dispersed therein, which align themselves as a function of the electrical voltage applied to the surface electrodes, by which means the optical properties can be adjusted. The carrier films 14, 15 are made of PET and have a thickness of, for example, 0.125 mm. The carrier films 14, 15 are provided with a coating of ITO facing the active layer 11 and having a thickness of approx. 100 nm, which form [sic] the first surface electrode 12 and the second surface electrode 13. The surface electrodes 12, 13 can be connected to the onboard electrical system via busbars 18, 19 and connection cables (not shown). The busbars 18, 19 are formed by a silver-containing screen print. The first surface electrode 12 has three separating lines 16 with, in each case, a width of 200 μm, introduced by means of a laser process, and which divide the first surface electrode 12 into four segments 17. A separating line 16 runs meanderingly between the side edges 4.2, 4.4, on which the first busbars 18 are arranged. The meandering separating line 16 divides into horizontal sections 16.2, which run between the side edges 4.2, 4.4 with the first busbars 18, and vertical sections 16.1, which run essentially parallel to the side edges 4.2, 4.4 with the first busbars 18. The vertical sections 16.1 of the separating line 16 are positioned, in the installed state of the functional element 5, in the region of the masking print 9 (see FIG. 1*a*). The horizontal sections 16.2 of the separating lines 16 are spaced approximately 5 cm apart or, in the case of the segments at the edge, approximately 5 cm from the nearest side edge 4.1, 4.3. The separating lines 16 electrically isolate the segments 17 from one another. The number of segments 17 can be freely selected depending on the application or customer requirements. The first surface electrode 12 has in each case one first busbar 18 per segment 17, i.e., a total of four first busbars 18. The first busbars 18 associated with segments 17 adjacent one another are situated at opposite side edges 4.2, 4.4 of the functional element 5. A first busbar 18 is thus, at one side edge 4.2 or 4.4, the first busbar 18 of the next but one segment. These adjacent first busbars 18 are likewise electrically separated from one another by a separating line 16, that runs between the nearest side edge 4.2, 4.4 and the vertical section of the meandering separating line 16. The side edges 4.2, 4.4 of the functional element 5, which accommodate the first busbars 18, are arranged, in the installed position of the functional element 5, at the side edges of the windshield (adjacent the A pillars of the vehicle body). FIG. 2*c* depicts a cross-section along the section line BB', which depicts the contacting of the first busbar 18 on the first surface electrode 12. The second carrier film 15, the second surface electrode 13, and the active layer 11 are removed in the region of the functional element 5 that is intended for the first busbars 18. The first busbars 18 are printed by screen printing onto the first surface electrode 12 thus exposed. The first busbars 18 occupy a maximum possible width corresponding to the distance between adjacent separating lines 16 or between the separating line 16 and the side edge 4.1 or 4.3. The second busbar 19 ensures the electrical contacting of the second surface electrode 13. It is attached at the side edge 4.1, which points in the direction of the front roof edge in the installed position of the functional element 5. A single second busbar 19 suffices in this case for the electrical contacting of the functional element 5. The side edge 4.3 opposite the second busbar 19 remains free, ensuring a visually appealing transition to the remaining glazing surface. In the region of the second busbar 19, according to FIG. 2*b*, the first carrier film 14 together with the first surface electrode 12 is removed by cutting back the film. The active layer 11 is likewise removed in this region. The second busbar 19 is printed onto the exposed second surface electrode 13 and thus makes electrical contact with the second surface electrode 13 in this region.

FIG. 3 depicts a plan view of an embodiment of a composite pane according to the invention as a roof panel. The roof panel comprises a first pane 1, which serves as the outer pane, and a second pane 2 as the inner pane. Here, the inner pane is the pane facing the vehicle's interior, whereas the outer pane points toward the vehicle's surroundings. The first pane 1 and the second pane 2 are joined to one another via an intermediate layer 3. The first pane 1 is made of clear soda lime glass with a thickness of 2.1 mm. The second pane 2 is made of soda lime glass with a thickness of 1.6 mm and is tinted gray. The tinted inner glass contributes to the attractive appearance of the pane, even for the vehicle occupant when looking through the roof panel. The composite pane as a roof panel has a front roof edge D in the installed position of the windshield and a rear roof panel D' facing the rear pane in the installed position.

The roof panel is equipped with a functional element 5 as large-area shading, wherein the functional element is formed by a commercially available PDLC multilayer film that is integrated into the intermediate layer 3. The structure of the intermediate layer 3 corresponds essentially to that described in FIGS. 1a and 1b, wherein, in contrast thereto, the functional element extends in the entire through-vision region of the glazing. In the embodiment as a roof panel as well, the intermediate layer 3 is formed by the three thermoplastic laminating films 6, 7, 8, as described in FIGS. 1a and 1b. These are implemented in each case by a thermoplastic film with a thickness of 0.38 mm made of PVB. The first thermoplastic laminating film 6 is bonded to the first pane 1; the second thermoplastic laminating film 7, to the second pane 2. The thermoplastic frame film 8 positioned therebetween has a cutout, into which the cut-to-size PDLC multilayer film is inserted with an exact fit, i.e., flush on all sides. Depending on the thickness of the multilayer film and a resultant difference in thickness relative to the region without the functional element 5, the frame film 8 can be dispensed with. This is also dependent on the complexity of the bending of the composite pane. Generally speaking, in the case of small differences in thickness between areas with a functional element and areas without a functional element and in the case of low complexity of the bending, a frame film can be dispensed with.

The first thermoplastic laminating film 6 and the second thermoplastic laminating film 7 are tinted gray in order to make the appearance of the roof panel attractive.

Optionally, an additional thermoplastic laminating film (not shown) can be introduced adjacent the outer pane (first pane 1). Carrier films with functional layers, for example, a carrier film with an infrared reflecting coating, can be incorporated via the additional thermoplastic laminating film. The infrared reflecting coating is oriented in the direction of the first pane 1 (outer pane) and serves to reduce the heating of the passenger compartment by solar radiation.

The roof panel according to the invention likewise has the circumferential masking print 9 already described for a windshield according to the invention, which conceals both the adhesive bond of the windshield to the vehicle body and the electrical contacting of the surface electrodes of the functional element 5. The distance of the functional element 5 from the front roof edge D, from the rear roof edge D', and from the side edges of the roof panel is less than the width of the masking print 9 such that the side edges 4.1, 4.2, 4.3, 4.4 of the functional element 5 are concealed by the masking print 9. The electrical connections are also reasonably attached in the region of the masking print 9 and thus advantageously concealed.

FIG. 4a depicts a plan view of the functional element 5 of the roof panel of FIG. 3 before integration of the functional element 5 into the composite pane, wherein the electrical contacting of the functional element 5 can also be seen. FIG. 4b depicts a cross-section through the functional element of FIG. 4a along the section line EE'. The adjustable functional element 5 is a multilayer film, which corresponds in its composition to that described in FIG. 2a. The first surface electrode 12 has separating lines 16 with a width in each case, of 200 μm, introduced by means of a laser process, and which divide the first surface electrode 12 into six segments 17. The size of the segments 17 depends on the size of the roof panel, with the through-vision region of the pane divided by the separating line 16 into six subregions roughly equal in area. The separating lines 16 electrically isolate the segments 17 from one another. A separating line 16 runs meanderingly between the side edges 4.2, 4.4, on which the first busbars 18 are arranged. The meandering separating line 16 is divided into horizontal sections 16.2 that run between the side edges 4.2, 4.4 with the first busbars 18 and vertical sections 16.1 that run essentially parallel to the side edges 4.2, 4.4 with the first busbars 18. The vertical sections 16.1 of the separating line 16 are positioned, in the installed state of the functional element 5, in the region of the masking print 9 (see FIG. 3). The number of segments 17 can be freely selected depending on the application or customer requirements. The contacting of the segments 17 essentially corresponds to that described in FIGS. 2a, 2b, and 2c. The first surface electrode 12 has, in each case, one first busbar 18 per segment 17, i.e., a total of six first busbars 18. The first busbars 18 associated with adjacent segments 17 are situated at opposite side edges 4.2, 4.4 of the functional element 5. In this manner, the length of busbars 18 can be maximized. First busbars 18 adjacent a common side edge 4.2 or 4.4 are likewise electrically separated by a separating line 16 that runs between the nearest side edge 4.2, 4.4 and the vertical section of the meandering separating line 16. The side edges 4.2, 4.4 of the functional element 5, which accommodate the first busbars 18, are arranged, in the installed position of the functional element 5, at the side edges of the roof panel (above the side doors of the vehicle). A cross-section through the functional element of FIG. 4a along the section line BB' corresponds in its schematic structure to that already depicted in FIG. 2c. At this point, the contacting of the first busbar 18 on the first surface electrode 12 is described in detail. In contrast to the functional element 5 as a sun visor described in FIG. 2a, the functional element 5 of FIG. 4a provided for full-surface shading of a roof panel has an additional second busbar 19. Since all side edges 4.1, 4.2, 4.3, 4.4 of the functional element 5 are positioned outside the through-vision region of the pane and are concealed by the peripheral masking print 9, all side edges are available for contacting the surface electrodes. A second busbar 19 is arranged analogous to the functional element 5 described in FIG. 2a at the front roof edge D of the roof panel. Another second busbar 19 is arranged along the rear roof edge D' at the opposite side edge 4.3 of the functional element 5. A cross-section along the section line EE' of the functional element of FIG. 4a is depicted in FIG. 4b. The structure is analogous to that described in FIG. 2b, wherein, in contrast thereto, along two opposite side edges 4.1, 4.3 of the functional element 5, the first carrier film 14, the first surface electrode 12, and the active layer 11 are removed in one area in each case and one second busbar 19 is printed in each case.

The use of two second busbars 19 is particularly advantageous in order to achieve uniform voltage distribution, even in the case of large dimensions of the functional element 5.

FIG. 5 depicts, using a flowchart, an exemplary embodiment of the production method according to the invention comprising the steps:

I Providing a functional element 5,

II Introducing at least one separating line 16 by means of laser into the first surface electrode 12 of the functional element 5, wherein the at least one separating line 16 divides the first surface electrode 12 into at least two segments 17, III Electrically contacting the first surface electrode 12 with, in each case, a first busbar 18 per segment 17 and electrically contacting the second surface electrode 13 with at least one second busbar 19, IV Creating a layer stack comprising, in this order, at least:
a first pane 1, a first thermoplastic laminating film 6, the functional element 5, a second thermoplastic laminating film 7, and a second pane 2, V Autoclaving the arrangement to produce a composite pane.

LIST OF REFERENCE CHARACTERS 1 first pane
2 second pane
3 intermediate layer
4.1, 4.2, 4.3, 4.4 side edges
5 functional element with electrically adjustable optical properties
6 first thermoplastic laminating film
7 second thermoplastic laminating film
8 thermoplastic frame film
9 masking print
10 tinted region of the first thermoplastic laminating film
11 active layer of the functional element 5
12 first surface electrode of the functional element 5
13 second surface electrode of the functional element 5
14 first carrier film
15 second carrier film
16 separating lines
16.1 vertical sections of the separating lines 16
16.2 horizontal sections of the separating lines 16
17 segments
18 first busbar
19 second busbar
D front roof edge
D' rear roof edge
M engine edge
S side edges
A-A', C-C', E-E' section line

The invention claimed is:

1. A composite pane having a functional element that can be switched in segments and that has electrically controllable optical properties, comprising a first pane, and a second pane, which are joined to one another via an intermediate layer, and a functional element with a plurality of side edges, which is embedded in the intermediate layer, wherein
the functional element includes, arranged flat one over another, a first surface electrode and a second surface electrode, between which an active layer is arranged flat,
the first surface electrode is divided into multiple segments by at least one separating line,
a group of first busbars electrically conductively contact the first surface electrode, and each segment of the first surface electrode is electrically conductively contacted by one busbar from the group of the first busbars,
at least one second busbar electrically conductively contacts the second surface electrode, and
wherein, a length of a first busbar, along the segment associated therewith, exceeds a width of the segment, and first busbars, which contact segments adjacent one another, are arranged at opposite side edges of the functional element, and wherein the first busbars adjacent one another at a common side edge are electrically separated from one another by separating lines.

2. The composite pane according to claim 1, wherein the at least one separating line runs meanderingly between two opposite side edges and is divided into vertical sections, which run essentially parallel to a nearest first busbars, and into horizontal sections, which run essentially parallel to the at least one second busbar.

3. The composite pane according to claim 2, wherein the separating lines, which separate the first busbars adjacent a common side edge from one another, run as horizontal separating lines between the corresponding side edge of the functional element and the nearest vertical section of a meandering separating line.

4. The composite pane according to claim 1, wherein the length of the first busbars is between 120% and 300% of the width of the contacted segment, wherein the width of the contacted segment equals a shortest distance between the separating lines delimiting the segment and/or the side edges of the functional element.

5. The composite pane according to claim 1, wherein the functional element is a PDLC functional element.

6. The composite pane according to claim 1, wherein the at least one second busbar is attached adjacent one of the side edges of the functional element, on which no busbar of the group of first busbars is situated.

7. The composite pane according to claim 1, wherein a length of the at least one second busbar is at least 70% of a length of the nearest side edge of the functional element.

8. The composite pane according to claim 7, wherein the length of the at least one second busbar is at least 90% of the length of the nearest side edge of the functional element.

9. The composite pane according to claim 1, wherein the functional element has at least two second busbars and the at least two second busbars are arranged adjacent opposite side edges of the functional element.

10. The composite pane according to claim 1, wherein the composite pane is a windshield of a motor vehicle, comprising an engine edge, a front roof edge and two side edges, the functional element is designed as a sun visor in the vicinity of the front roof edge, and wherein
the at least one separating line divides the first surface electrode into at least three segments,
a second busbar runs adjacent the side edge of the functional element nearest the front roof edge and electrically conductively contacts the second surface electrode, and
each segment of the first surface electrode is contacted by one first busbar in each case.

11. The composite pane according to claim 1, wherein the composite pane is a roof panel of a motor vehicle comprising a front roof edge, a rear roof edge and two side edges, the functional element is designed as large-area shading of the roof panel, and wherein the at least one separating line within the first surface electrode divides the first surface electrode into at least two segments, a second busbar essentially parallel to the front roof edge runs adjacent the side edge of the functional element nearest the front roof edge and electrically conductively contacts the second surface electrode, another second busbar essentially parallel to the rear roof edge runs adjacent the side edge of the functional element nearest the rear roof edge and electrically conductively contacts the second surface electrode, each segment of the first surface electrode is contacted by one first busbar.

12. The composite pane according to claim 1, wherein the first busbars and the second busbars comprise an electrically conductive structure and have a thickness of 5 µm to 40 µm.

13. The composite pane according to claim 12, wherein the electrically conductive structure contains silver.

14. The composite pane according to claim 1, wherein the first surface electrode and the second surface electrode contain at least one metal, one metal alloy, or one transparent conductive oxide and have a thickness of 10 nm to 2 µm.

15. The composite pane according to claim 14, wherein the first surface electrode and the second surface electrode contain one transparent conductive oxide.

16. The composite pane according to claim 1, wherein the intermediate layer has a first thermoplastic laminating film, which is arranged between the functional element and the first pane, and has a second thermoplastic laminating film, which is arranged between the functional element and the second pane.

17. A method for producing a composite pane according to claim 1 comprising:
a) providing a functional element,
b) introducing at least one separating line, which divides the first surface electrode into at least two segments, into the first surface electrode of the functional element,
c) attaching one first busbar per segment on the first surface electrode,
d) attaching at least one second busbar on the second surface electrode,
e) placing at least one first thermoplastic laminating film on a first pane, placing the functional element on the first thermoplastic laminating film, wherein at least one second thermoplastic laminating film and a second pane are arranged one over another in this order on the functional element,
f) bonding the first pane and the second pane by lamination, wherein an intermediate layer with an embedded functional element is formed from the first thermoplastic laminating film and the second thermoplastic laminating film.

18. A method comprising utilizing a composite pane according to claim 1 as building glazing or motor vehicle glazing.

19. The method according to claim 18, wherein the motor vehicle glazing is a windshield or a roof panel of a motor vehicle.

* * * * *